US010722876B2

(12) United States Patent
Liu et al.

(10) Patent No.: US 10,722,876 B2
(45) Date of Patent: Jul. 28, 2020

(54) CATALYTIC ARTICLES

(71) Applicant: BASF Corporation, Florham Park, NJ (US)

(72) Inventors: Xinzhu Liu, Shanghai (CN); Michael Galligan, Cranford, NJ (US); Ye Liu, Holmdel, NJ (US); Young Gin Kim, Edison, NJ (US); Milena Kudziela, Avenel, NJ (US); Xinsheng Liu, Edison, NJ (US); Pascaline Tran, Holmdel, NJ (US)

(73) Assignee: BASF Corporation, Florham Park, NJ (US)

(*) Notice: Subject to any disclaimer, the term of this patent is extended or adjusted under 35 U.S.C. 154(b) by 0 days.

(21) Appl. No.: 16/340,549

(22) PCT Filed: Oct. 12, 2016

(86) PCT No.: PCT/CN2016/101898
§ 371 (c)(1),
(2) Date: Apr. 9, 2019

(87) PCT Pub. No.: WO2018/068227
PCT Pub. Date: Apr. 19, 2018

(65) Prior Publication Data
US 2019/0314800 A1    Oct. 17, 2019

(51) Int. Cl.
*B01J 33/00* (2006.01)
*B01J 29/068* (2006.01)
(Continued)

(52) U.S. Cl.
CPC ............. *B01J 33/00* (2013.01); *B01J 29/068* (2013.01); *B01J 35/0006* (2013.01); *F01N 3/2803* (2013.01); *B01J 35/1004* (2013.01)

(58) Field of Classification Search
CPC ....... B01D 53/945; F01J 29/068; B01J 33/00; B01J 35/0006; F01N 3/2803
(Continued)

(56) References Cited

U.S. PATENT DOCUMENTS 7,229,597 B2    6/2007    Patchett et al.
7,759,283 B2    7/2010    Yamato et al.
(Continued)

FOREIGN PATENT DOCUMENTS

CN    101181681    5/2008
JP    2006192365    7/2006
(Continued)

OTHER PUBLICATIONS

International Search Report and Written Opinion for International Application No. PCT/CN2016/101898 dated Jul. 20, 2017, 7 pages.

*Primary Examiner* — Tom P Duong
(74) *Attorney, Agent, or Firm* — Lowenstein Sandler LLP

(57) ABSTRACT

Catalytic articles comprising a substrate having a catalytic coating thereon, the catalytic coating comprising a catalytic layer having a thickness and an inner surface proximate to the substrate and an outer surface distal to the substrate; where the catalytic layer comprises a noble metal component on support particles and where the concentration of the noble metal component towards the outer surface is greater than the concentration towards the inner surface are highly effective towards treating exhaust gas streams of internal combustion engines. The articles are prepared via a method comprising providing a first mixture comprising micron-scaled support particles and applying the first mixture to a substrate to form a micro-particle layer; providing a second mixture comprising nano-scaled support particles and a
(Continued)

noble metal component having an initial pH and applying the second mixture to the micro-particle layer and calcining the substrate.

15 Claims, 2 Drawing Sheets

(51) Int. Cl.
    *B01J 35/00*     (2006.01)
    *F01N 3/28*     (2006.01)
    *B01J 35/10*     (2006.01)

(58) Field of Classification Search
    USPC ...... 422/168; 423/213.5; 502/300, 330, 339, 502/263
    See application file for complete search history.

(56) References Cited

U.S. PATENT DOCUMENTS

| | | | |
|---|---|---|---|
| 2008/0187477 A1 | | 8/2008 | Nochi et al. |
| 2014/0241964 A1 | * | 8/2014 | Bergeal ................ B01D 53/945 423/213.5 |

FOREIGN PATENT DOCUMENTS

| | | | | |
|---|---|---|---|---|
| RU | 2262983 C2 | | 10/2005 | |
| WO | 2011017139 A2 | | 2/2011 | |
| WO | 2011075399 A1 | | 6/2011 | |
| WO | 2013050784 A2 | | 4/2013 | |
| WO | WO-2014132034 A1 | * | 9/2014 | ........... B01D 53/944 |
| WO | 2016070090 | | 5/2016 | |

* cited by examiner

CATALYTIC ARTICLES

CROSS REFERENCE TO RELATED APPLICATION(S)

This application is a national stage entry under 35 U.S.C. § 371 of International Application No. PCT/CN2016/101898, filed on Oct. 12, 2016, the disclosure of which is hereby incorporated by reference herein in its entirety.

TECHNICAL FIELD

The present invention is aimed at catalytic articles for use in treating exhaust of an internal combustion engine.

BACKGROUND

Exhaust gas streams of internal combustion engines contain pollutants such as hydrocarbons (HC), carbon monoxide (CO) and nitrogen oxides (NOx) that foul the air. Catalysts useful in treating exhaust gases of internal combustion engines include platinum group metals (PGM), for instance via oxidation of hydrocarbons and carbon monoxide.

There exists a need for still more efficient catalysts for the treatment of exhaust gases of internal combustion engines.

SUMMARY

Accordingly, disclosed is a catalytic article comprising a substrate having a catalytic coating thereon, the catalytic coating comprising a catalytic layer having a thickness and an inner surface proximate to the substrate and an outer surface distal to the substrate; where the catalytic layer comprises a noble metal component on support particles and where the concentration of the noble metal component towards the outer surface is greater than the concentration towards the inner surface.

Also disclosed is a method of making the catalytic articles comprising providing a first mixture comprising micron-scaled support particles and applying the first mixture to a substrate to form a micro-particle layer; providing a second mixture comprising nano-scaled support particles and a noble metal component having an initial pH and applying the second mixture to the micro-particle layer and calcining the substrate.

DETAILED DISCLOSURE

Figure 1:
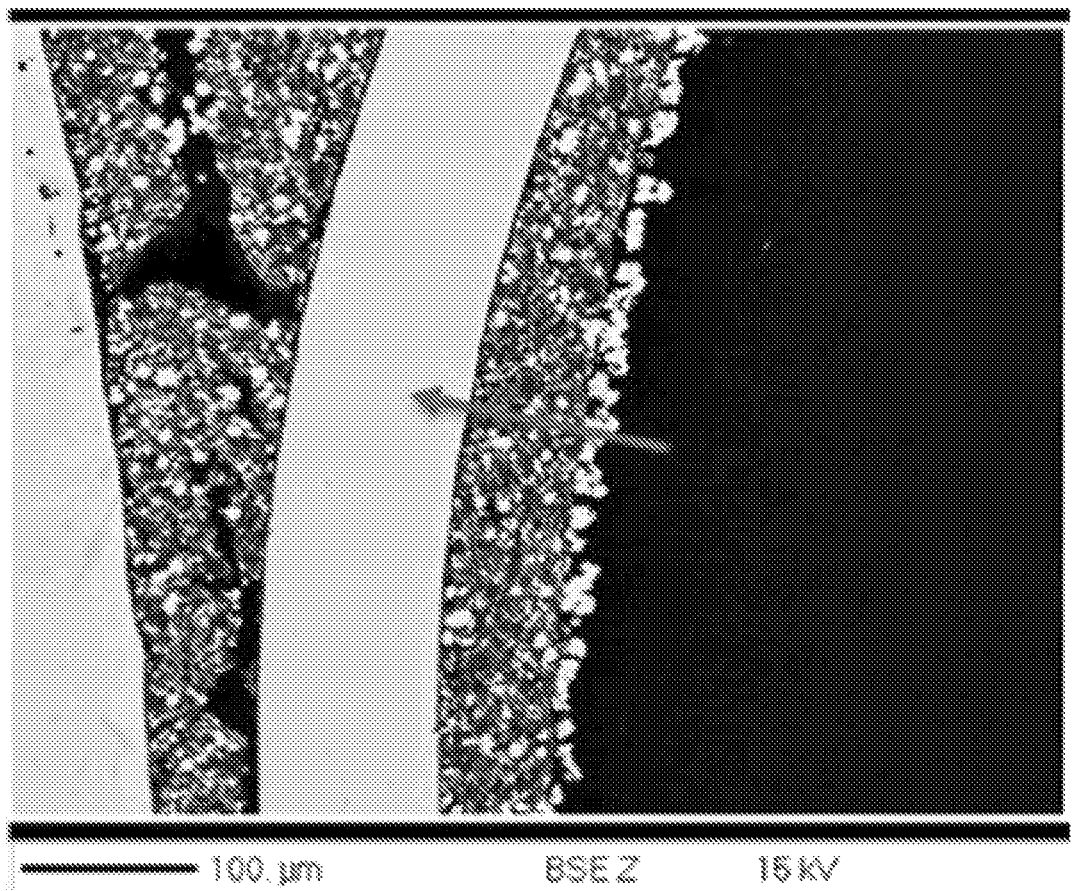
FIG. 1 is a SEM image of the inventive sample of Example 1. The arrow points to a monolith wall.

The present catalytic layer comprises a noble metal component on support particles. The noble metal is in particular a platinum group metal (PGM), for instance platinum or palladium. The catalytic coating layer has a thickness, an inner surface proximate to a substrate and an outer surface distal to the substrate. The outer surface will face the atmosphere and/or exhaust gas stream of an engine. A platinum group metal component may comprise a mixture of platinum and palladium, for instance at a weight ratio of from about 1:5 to about 5:1.

The noble metal is present in the catalytic layer in a gradient, that is, the concentration of the noble metal towards the outer surface is greater than the concentration towards the inner surface. The catalytic layer thickness for instance may be from about 6, about 8 or about 10 microns to about 15, about 20, about 30, about 50, about 75, about 100, about 150, about 200, about 250, about 300 or about 350 microns.

For instance, at least 50 wt % (weight percent) of the noble metal component may reside in the outer one fifth (20%) of the thickness of the catalytic layer. Also, at least 60 wt % or at least 70 wt % of the noble metal component may reside in the outer one half of the thickness of the catalytic layer. For example from about 80 wt % to about 90 wt % of the noble metal may reside in the outer 20% of the thickness of the catalytic layer.

The support for example comprises refractory metal oxides, which porous metal-containing oxide materials exhibit chemical and physical stability at high temperatures, such as the temperatures associated with gasoline or diesel engine exhaust. Exemplary metal oxides include alumina, silica, zirconia, titania, ceria, praseodymia, tin oxide, and the like, as well as physical mixtures or chemical combinations thereof, including atomically-doped combinations and including high surface area or activated compounds such as activated alumina.

Included are combinations of metal oxides such as silica-alumina, ceria-zirconia, praseodymia-ceria, alumina-zirconia, alumina-ceria-zirconia, lanthana-alumina, lanthana-zirconia-alumina, baria-alumina, baria-lanthana-alumina, baria-lanthana-neodymia alumina and alumina-ceria. Exemplary aluminas include large pore boehmite, gamma-alumina, and delta/theta alumina. Useful commercial aluminas used as starting materials in exemplary processes include activated aluminas, such as high bulk density gamma-alumina, low or medium bulk density large pore gamma-alumina and low bulk density large pore boehmite and gamma-alumina.

High surface area metal oxide supports, such as alumina support materials, also referred to as "gamma alumina" or "activated alumina," typically exhibit a BET surface area in excess of 60 $m^2/g$, often up to about 200 $m^2/g$ or higher. An exemplary refractory metal oxide comprises high surface area γ-alumina having a specific surface area of about 50 to about 300 $m^2/g$. Such activated alumina is usually a mixture of the gamma and delta phases of alumina, but may also contain substantial amounts of eta, kappa and theta alumina phases. "BET surface area" has its usual meaning of referring to the Brunauer, Emmett, Teller method for determining surface area by $N_2$ adsorption. Desirably, the active alumina has a specific surface area of about 60 to about 350 $m^2/g$, for example from about 90 to about 250 $m^2/g$.

In certain embodiments, metal oxide supports useful in the catalyst compositions disclosed herein are doped alumina materials, such as Si-doped alumina materials (including, but not limited to 1-10% $SiO_2$—$Al_2O_3$), doped titania materials, such as Si-doped titania materials (including, but not limited to 1-10% $SiO_2$—$TiO_2$), or doped zirconia materials, such as Si-doped $ZrO_2$ (including, but not limited to 5-30% $SiO_2$—$ZrO_2$).

Advantageously, a refractory metal oxide may be doped with one or more additional metal oxide dopants, such as lanthana, baria, strontium oxide, calcium oxide, magnesium oxide, or combinations thereof. The metal oxide dopant is typically present in an amount of about 1 to about 20% by weight, based on the weight of the catalytic layer.

The dopant metal oxides can be introduced using an incipient wetness impregnation technique or through usage of colloidal mixed oxide particles. Preferred dopant metal oxides include colloidal baria-alumina, baria-zirconia, baria-titania, zirconia-alumina, baria-zirconia-alumina, lanthana-zirconia and the like.

Thus the refractory metal oxides or refractory mixed metal oxides in the catalytic layer are most typically selected from the group consisting of alumina, zirconia, silica, titania, ceria, for example bulk ceria, manganese oxide, zirconia-alumina, ceria-zirconia, ceria-alumina, lanthana-alumina, baria-alumina, silica, silica-alumina and combinations thereof. These refractory metal oxides in the catalytic layer may be further doped with base metal oxides such as baria-alumina, baria-zirconia, baria-titania, zirconia-alumina, baria-zirconia-alumina, lanthana-zirconia and the like.

The catalytic layer may comprise any of the above named refractory metal oxides and in any amount. For example the refractory metal oxides in the catalytic layer may comprise at least about 15, at least about 20, at least about 25, at least about 30 or at least about 35 wt % (weight %) alumina where the wt % is based on the total dry weight of the catalytic layer. The catalytic layer may for example comprise from about 15 to about 95 wt % alumina or from about 20 to about 85 wt % alumina.

The catalytic layer comprises for example from about 15 wt %, about 20 wt %, about 25 wt %, about 30 wt % or about 35 wt % to about 50 wt %, about 55 wt %, about 60 wt % about 65 wt % or about 70 wt % alumina based on the weight of the catalytic layer.

Advantageously, the catalytic layer may comprise ceria, alumina and zirconia.

The noble metal is for example present in the catalytic layer from about 0.1 wt %, about 0.5 wt %, about 1.0 wt %, about 1.5 wt % or about 2.0 wt % to about 3 wt %, about 5 wt %, about 7 wt %, about 9 wt %, about 10 wt %, about 12 wt % or about 15 wt %, based on the weight of the layer.

The noble metal is for example present from about 2 $g/ft^3$, about 5 $g/ft^3$, about 10 $g/ft^3$, about 15 $g/ft^3$ or about 20 $g/ft^3$ to about 40 $g/ft^3$, about 50 $g/ft^3$, about 60 $g/ft^3$, about 70 $g/ft^3$, about 80 $g/ft^3$, about 90 $g/ft^3$ or about 100 $g/ft^3$, based on the volume of the substrate.

The catalytic layer in addition to the refractory metal oxide and PGM may further comprise any one or combinations of the oxides of lanthanum, barium, praseodymium, neodymium, samarium, strontium, calcium, magnesium, niobium, hafnium, gadolinium, manganese, iron, tin, zinc or copper.

The oxygen storage component (OSC) is an entity that has multi-valent oxidation states and can actively react with oxidants such as oxygen ($O_2$) or nitric oxides ($NO_2$) under oxidative conditions or react with reductants such as carbon monoxide (CO), hydrocarbons (HC) or hydrogen ($H_2$) under reduction conditions. Examples of suitable oxygen storage components include ceria and praseodymia. An OSC is sometimes used in the form of mixed oxides. For example, ceria can be delivered as a mixed oxide of cerium and zirconium and/or a mixed oxide of cerium, zirconium and neodymium. For example, praseodymia can be delivered as a mixed oxide of praseodymium and zirconium and/or a mixed oxide of praseodymium, cerium, lanthanum, yttrium, zirconium and neodymium.

For instance, OSC components are metal oxides and/or mixed metal oxides of metals selected from the group consisting of cerium, zirconium, neodymium, praseodymia, lanthanum and yttrium.

An OSC component may be present in the catalytic layer for example from about 1 wt % to about 65 wt %. For example, an OSC component such as ceria may be present from about 1 wt % to about 60 wt %, from about 5 to about 50 wt % or from about 8 to about 40 wt % of the total dry weight of the layer.

The catalytic layer may further comprise a base metal oxide for example an oxide of lanthanum, barium, praseodymium, neodymium, samarium, strontium, calcium, magnesium, niobium, hafnium, gadolinium, manganese, iron, tin, zinc, copper or combinations thereof. Base metal oxides may be present from about 0.1 to about 5.0 wt %, based on the total dry weight of the layer.

The present catalytic layer advantageously contains support particles having a bimodal particle size distribution comprising micron-scaled particles and nano-scaled particles.

Micron-scaled particles for example have an average particle size from about 1, about 2, about 3, about 4 or about 5 microns to about 6, about 7, about 8, about 9, about 10 or about 11 microns. For example, present micron-scaled particles have a D90 of from about 8, about 9 or about 10 microns to about 12, about 13, about 14, about 15 microns, about 20, about 25, about 30, about 35, about 40 or about 50 microns.

The nano-scaled particles for instance have an average particle size of $\leq 950$ nm, $\leq 900$ nm, $\leq 850$ nm, $\leq 800$ nm, $\leq 750$ nm, $\leq 700$ nm, $\leq 650$ nm, $\leq 600$ nm, $\leq 550$ nm, $\leq 500$ nm, $\leq 450$ nm, $\leq 400$ nm, $\leq 350$ nm, $\leq 300$ nm, $\leq 250$ nm, $\leq 200$ nm, $\leq 150$ nm or $\leq 100$ nm. For example, having an average particle size of from about 1 nm, about 2 nm, about 3 nm, about 4 nm, about 5 nm, about 7 nm, about 10 nm, about 15 nm, about 20 nm, about 25 nm, about 30 nm, about 35 nm, about 40 nm, about 45 nm or about 50 nm to about 200 nm, about 300 nm, about 400 nm, about 500 nm, about 600 nm, about 700 nm, about 800 nm or about 900 nm.

Oxygen storage components in the present invention are considered to be a possible support particle, together with other supports such as alumina or on their own. That is, the discussion regarding particle size refers also to oxygen storage components.

Particles may be primary particles and/or may be in the form of agglomerates. Particle size refers to primary particles.

The term "substrate" refers in general to a monolithic material onto which a catalytic coating is disposed, for example a flow-through monolith or monolithic wall-flow filter. In one or more embodiments, the substrate is a ceramic or metal having a honeycomb structure. Any suitable substrate may be employed, such as a monolithic substrate of the type having fine, parallel gas flow passages extending from an inlet end to an outlet end of the substrate such that passages are open to fluid flow. The passages, which are essentially straight paths from their fluid inlet to their fluid outlet, are defined by walls on which a catalytic coating is disposed so that gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Such structures may contain from about 16 to about 900 or more gas inlet openings (i.e. cells) per square inch of cross-section.

Present substrates are 3-dimensional having a length and a diameter and a volume, similar to a cylinder. The shape does not necessarily have to conform to a cylinder. The length is an axial length defined by an inlet end and an outlet end.

The inlet end of a substrate is synonymous with the "upstream" end or "front" end. The outlet end is synonymous with the "downstream" end or "rear" end. A substrate will have a length and a width and a volume. An upstream zone is upstream of a downstream zone. A zone of a catalyzed substrate is defined as a cross-section having a certain coating structure thereon.

Flow-through monolith substrates for example have a volume of from about 50 in$^3$ to about 1200 in$^3$, a cell density of from about 16 cells per square inch (cpsi) to about 500 cpsi or up to about 900 cpsi, for example from about 200 to about 400 cpsi and a wall thickness of from about 50 to about 200 microns or about 400 microns.

The substrate may be a "flow-through" monolith as described above. Alternatively, a catalytic coating may be disposed on a wall-flow filter soot filter, thus producing a Catalyzed Soot Filter (CSF). If a wall-flow substrate is utilized, the resulting system will be able to remove particulate matter along with gaseous pollutants. The wall-flow filter substrate can be made from materials commonly known in the art, such as cordierite, aluminum titanate or silicon carbide. Loading of the catalytic coating on a wall-flow substrate will depend on substrate properties such as porosity and wall thickness and typically will be lower than the catalyst loading on a flow-through substrate.

Wall-flow filter substrates useful for supporting the SCR catalytic coatings have a plurality of fine, substantially parallel gas flow passages extending along the longitudinal axis of the substrate. Typically, each passage is blocked at one end of the substrate body, with alternate passages blocked at opposite end-faces. Such monolithic carriers may contain up to about 700 or more flow passages (or "cells") per square inch of cross-section, although far fewer may be used. For example, the typical carrier usually has from about 100 to about 300, cells per square inch ("cpsi"). The cells can have cross-sections that are rectangular, square, circular, oval, triangular, hexagonal, or are of other polygonal shapes. Wall-flow substrates typically have a wall thickness from about 50 microns to about 500 microns, for example from about 150 microns to about 400 microns. Wall-flow filters will generally have a wall porosity of at least 40% with an average pore size of at least 10 microns prior to disposition of the catalytic coating. For instance, wall-flow filters will have a wall porosity of from about 50 to about 75% and an average pore size of from about 10 to about 30 microns prior to disposition of a catalytic coating.

Catalyzed wall-flow filters are disclosed for instance in U.S. Pat. No. 7,229,597. This reference teaches a method of applying a catalytic coating such that the coating permeates the porous walls, that is, is dispersed throughout the walls. Flow-through and wall-flow substrates are also taught for example in U.S. Pat. app. No. 62/072,687, published as WO2016/070090.

For example, in the present systems the first substrate is a porous wall-flow filter and the second substrate is a flow-through monolith or alternatively, the first substrate is a flow-through monolith and the second substrate is a porous wall-flow filter. Alternatively, both substrates may be identical and may be flow-through or wall-flow substrates.

The present catalytic coating may be on the wall surface and/or in the pores of the walls, that is "in" and/or "on" the filter walls. Thus, the phrase "having a catalytic coating thereon" means on any surface, for example on a wall surface and/or on a pore surface.

The catalytic layer may each extend the entire length of the substrate or may extend a portion of the length of the substrate. The catalytic layer may extend from either the inlet or outlet end. For example, the catalytic layer may extend from the outlet end towards the inlet end about 10%, about 20%, about 30%, about 40%, about 50%, about 60%, about 70% or about 80% of the substrate length. Alternatively, the catalytic layer may extend from the inlet end towards the outlet end about 10%, about 20%, about 30%, about 40%, about 50%, about 60%, about 70% or about 80% of the substrate length.

The present catalytic coating may consist of the catalytic layer which is in direct contact with the substrate and directly exposed to an exhaust gas stream. Alternatively, the catalytic coating may comprise one or more other coating layers besides the present catalytic layer. One or more "undercoats" may be present, so that at least a portion of the catalytic layer is not in direct contact with the substrate (but rather with the undercoat). One or more "overcoats" may also be present, so that at least a portion of the catalytic layer is not directly exposed to a gaseous stream or atmosphere (but rather is in contact with the overcoat). One or more interlayers may also be present.

An undercoat is a layer "under" a coating layer, an overcoat is a layer "over" a coating layer and an interlayer is a layer "between" two coating layers.

The interlayer(s), undercoat(s) and overcoat(s) may contain one or more catalysts or may be free of catalysts.

The internal combustion engine is for example a small engine, for instance two-stroke or four-stroke spark ignition engines used to provide power to machinery such as lawn mowers, chain saws, leaf blowers, string cutters, motor scooters, motorcycles, mopeds and the like. Small engines produce exhaust gas streams having a high concentration of unburned fuel and unconsumed oxygen.

The method of forming the present graded catalytic layers comprises providing a first mixture comprising micron-scaled support particles and applying the first mixture to a substrate to form a micro-particle layer; providing a second mixture comprising nano-scaled support particles and a noble metal component and having an initial pH and applying the second mixture to the micro-particle layer and calcining the thus coated substrate.

The support particles of the first and second mixtures may have the same or different chemical compositions. That is, they may be identical (other than having different average particle size). Alternatively, they may have different chemical compositions. The support particles of each of the first and second mixtures may comprise a refractory metal oxide particles and/or oxygen storage component particles.

For example, a washcoat of finely divided micron-scaled particles of a high surface area refractory metal oxide such as gamma alumina are slurried in an appropriate vehicle, e.g. water. Along with the high surface area refractory metal oxide, an oxygen storage component may optionally be included and slurried with the refractory metal oxide. This slurry or washcoat is applied to a substrate. The substrate may be dipped one or more times in such a slurry or the slurry may be coated on the substrate such that there will be deposited on the substrate the desired loading of the refractory metal oxide and optional oxygen storage component.

The micron-scaled particles are advantageously milled to provide the desired particle size range.

The coated substrate results in a micro-particle layer. Thereafter, the coated substrate may advantageously be calcined by heating at a temperature from about 400° C. to about 600° C. for a period of from about 10 minutes to about 4 hours.

For instance, the first mixture contains micron-scaled ceria-alumina composite or micron-scaled ceria-alumina composite and micron-scaled bulk ceria.

Nanoparticles of a refractory metal oxide are treated with a noble metal component to form the metal component deposited on and/or impregnated in the refractory metal oxide nanoparticles. In this step also, refractory metal oxide nanoparticles may be combined with oxygen storage component nanoparticles. Alternatively, oxygen storage component nanoparticles are treated with the noble metal component to form the metal component deposited on and/or impregnated in oxygen storage component nanoparticles.

The mixture comprising nano-scaled particles may be in the form of a sol or colloidal dispersion. The dispersion or sol will normally be dispersed in water and of a colloidal nature. A sol is a stable dispersion containing nano-scaled particles.

Advantageously, the mixture comprising nano-scaled particles is a sol. For instance, preparation of the second mixture comprises addition of a zirconium sol and an aluminum sol or addition of a zirconium sol, an aluminum sol and a cerium sol; and also addition of a suitable noble metal compound or complex.

The noble metal components employed in the methods may be water-soluble compounds (e.g., precursor salts) or water-dispersible compounds (colloidal particles) or complexes. For example palladium compounds or complexes are typically used for deposition/impregnation. Generally aqueous solutions of soluble compounds or complexes of a PGM component are utilized. During the calcination step, or at least during the initial phase of use of the composite, such compounds are converted into a catalytically active form of the metal or a compound thereof. Generally, aqueous solutions of soluble compounds or complexes of the precious metals are used such as a platinum group metal salt or a colloidal dispersion of a platinum group metal. For example acetate salts, amine salts, nitrate salts, amine complex salts, nitrites, chlorides, bromides, iodides, sulfates of amine complex salts, diamine complex salts or tetraamine complex salts.

Specific palladium salts or complexes are for example palladium nitrate, palladium tetraamine hydroxide, colloidal palladium, palladium acetate, palladium nitrite, palladium diacetate, palladium(II) chloride, palladium(II) iodide, palladium (II) bromide, ammonium hexachlor-palladate(IV), ammonium tetrachloro-palladate(II), palladium(II) oxide, palladium(II) sulfate, cis-diamminedichloro-palladium(II), diamminedinitro-palladium(II), hydrogen tetrachloro-palladate(II), potassium hexachlor-palladate(IV), potassium tetrachlor-palladate(II), sodium tetrachloro-palladate(II), tetraamine palladium(II) chloride and tetraamine palladium hydrogen carbonate; for example palladium nitrate, palladium tetraamine hydroxide or colloidal palladium.

The weight ratio of the solids of the second mixture to the solids of the first mixture is for example from about 1 to about 1, about 2, about 3, about 4, about 5, about 6, about 7 or about 8.

The initial pH of the sol or colloidal dispersion of the second mixture containing nano-scaled particles may be ≥6 or ≥7. The nano-scaled mixture may advantageously be treated with an inorganic acid or an organic acid which is believed to aid in deposition (fixing) of the noble metal component onto the nanoparticles of refractory metal oxide and/or oxygen storage component.

The acid treatment of the second mixture may result in a pH adjustment for example to ≤6, ≤5, ≤4 or ≤3. For example, the acid treatment may result in a lower pH of from about 2, about 3 or about 4 to about 5, about 6, about 7, about 8, about 9, about 10, about 11 or about 12.

Inorganic acids include, but are not limited to, nitric acid. Dicarboxylic organic acids are especially effective in fixing PGM on support nanoparticles. Organic dicarboxylic acids include for example oxalic, malonic, succinic, glutamic, adipic, maleic, fumaric, phthalic, tartaric, pimelic acid, malic acid, sebacic acid, maleic acid, glutaric acid, azelaic acid, oxalic acid caccharic acid, aspartic acid, tartronic acid, mesoxalic acid, oxalacetic acid acetone dicarboxylic acid, itaconic acid, citric acid and the like.

For instance, a mixture containing nano-scaled particles may be prepared by mixing a cerium hydroxide sol, a zirconium nitrate sol, an alumina sol and a Pd (II) salt. A cerium sol contains for instance a cerium salt such as cerium hydroxide. A zirconium sol contains for instance a zirconium salt such as zirconium nitrate.

The nano-scaled particle mixture may be pH adjusted to for example from about 4 to about 5 with an organic acid such as tartaric acid. Advantageously, barium and/or lanthanum salts are added such as barium hydroxide and/or lanthanum hydroxide.

The weight ratio of the organic dicarboxylic acid to the noble metal component is for example from about 6, about 5, about 4, about 3 or about 2 to about 1.

The nano-scaled particles for instance have an average particle size of ≤950 nm, ≤900 nm, ≤850 nm, ≤800 nm, ≤750 nm, ≤700 nm, ≤650 nm, ≤600 nm, ≤550 nm, ≤500 nm, ≤450 nm, ≤400 nm, ≤350 nm, ≤300 nm, ≤250 nm, ≤200 nm, ≤150 nm or ≤100 nm. For example, having an average particle size of from about 10 nm, about 15 nm, about 20 nm, about 25 nm, about 30 nm, about 35 nm, about 40 nm, about 45 nm or about 50 nm to about 200 nm, about 300 nm, about 400 nm, about 500 nm, about 600 nm, about 700 nm, about 800 nm or about 900 nm.

The second mixture containing nano-scaled particles is applied to the formed micro-particle layer. The substrate having a micro-scaled particle layer thereon may be dipped one or more times in the second mixture containing nano-scaled particles to provide a desired loading of the refractory metal oxide, optional oxygen storage component and noble metal component.

The degree of the noble metal gradient may be adjusted by the degree of fixing of the noble metal on the support nanoparticles. The degree of fixing may be adjusted by the amount of acid treatment. The greater the degree of fixing, the more noble metal will be concentrated toward the outer surface of the catalytic coating.

The degree of fixing may be determined by directly measuring the amount of noble metal remaining in the supernatant fraction after centrifugation following the fixation step. For example, from about 40%, about 50% or about 60% to about 70%, about 80%, about 90%, about 95% or about 99% of the noble metal, by weight, are fixed to the support nanoparticles.

Stabilizers and/or promoters may also be incorporated into the first and/or second mixtures, for example barium acetate and/or lanthanum nitrate.

The weight ratio of the solids of the first mixture to the solids of the second mixture are for instance from about 10:1, about 9:1, about 8:1, about 7:1, about 6:1, about 5:1, about 4:1, about 3:1, about 2:1 to about 1:1.

The substrate now coated with both the first and second mixtures is calcined, for example by heating at a temperature from about 400° C. to about 600° C. for a period of from about 10 minutes to about 4 hours.

The present catalytic coating, as well as each zone of a catalytic coating or any section of a coating, is present on the substrate at a loading (concentration) of for instance from about 0.2 g/in³ to about 4.5 g/in³, or from about 0.4, about 0.5, about 0.6, about 0.7, about 0.8, about 0.9 or about 1.0 g/in³ to about 1.5 g/in³, about 2.0 g/in³, about 2.5 g/in³, about 3.0 g/in³, about 3.5 g/in³ or about 4.0 g/in³ based on the substrate. This refers to dry solids weight per volume of substrate, for example per volume of a honeycomb monolith.

These methods supply the present gradient noble metal supported catalytic layer. The support particles advantageously have a bimodal particle size distribution.

The present catalytic coating may function as an oxidation catalyst.

A treatment system contains one or more catalytic articles. A present exhaust gas treatment system includes the present catalytic article and optionally a further catalytic article. Further catalytic articles include selective catalytic reduction (SCR) articles, diesel oxidation catalysts (DOC), soot filters, ammonia oxidation catalysts (AMOx) and lean NOx traps (LNT).

The present treatment system may further comprise a selective catalytic reduction catalyst and/or diesel oxidation catalyst and/or a soot filter and/or an ammonia oxidation catalyst. A soot filter may be uncatalyzed or may be catalyzed (CSF).

"Noble metal components" refer to noble metals or compounds thereof, such as oxides. Noble metals are ruthenium, rhodium, palladium, silver, osmium, iridium, platinum and gold.

"Platinum group metal components" refer to platinum group metals or compounds thereof, for example oxides. Platinum group metals are ruthenium, rhodium, palladium, osmium, iridium and platinum.

Noble metal components and platinum group metal components also refer to any compound, complex, or the like which, upon calcinations or use thereof, decomposes or otherwise converts to a catalytically active form, usually the metal or the metal oxide.

The term "exhaust stream" or "exhaust gas stream" refers to any combination of flowing gas that may contain solid or liquid particulate matter. The stream comprises gaseous components which may contain certain non-gaseous components such as liquid droplets, solid particulates and the like. An exhaust stream of an internal combustion engine typically further comprises combustion products, products of incomplete combustion, oxides of nitrogen, combustible and/or carbonaceous particulate matter (soot) and un-reacted oxygen and/or nitrogen.

"BET surface area" has its usual meaning of referring to the Brunauer-Emmett-Teller method for determining surface area by $N_2$-adsorption measurements. Unless otherwise stated, "surface area" refers to BET surface area.

D90 particle size distribution indicates that 90% of the particles (by number) have a Feret diameter below a certain size as measured by Scanning Electron Microscopy (SEM) or Transmission Electron Microscopy (TEM). Average particle size is synonymous with D50, meaning half of the population resides above this point, and half below. Particle size refers to primary particles. Particle size may be measured by laser light scattering techniques, with dispersions or dry powders, for example according to ASTM method D4464.

The articles "a" and "an" herein refer to one or to more than one (e.g. at least one) of the grammatical object. Any ranges cited herein are inclusive. The term "about" used throughout is used to describe and account for small fluctuations. For instance, "about" may mean the numeric value may be modified by ±5%, ±4%, ±3%, ±2%, ±1%, ±0.5%, ±0.4%, ±0.3%, ±0.2%, ±0.1% or ±0.05%. All numeric values are modified by the term "about" whether or not explicitly indicated. Numeric values modified by the term "about" include the specific identified value. For example "about 5.0" includes 5.0.

Unless otherwise indicated, all parts and percentages are by weight. Weight percent (wt %), if not otherwise indicated, is based on an entire composition free of any volatiles, that is, based on dry solids content.

All U.S. patent applications, published patent applications and patents referred to herein are hereby incorporated by reference.

Following are some embodiments of the invention.

E1. A catalytic article comprising a substrate having a catalytic coating thereon,
the catalytic coating comprising a catalytic layer having a thickness and an inner surface proximate to the substrate and an outer surface distal to the substrate; where
the catalytic layer comprises a noble metal component on support particles and where the concentration of the noble metal component towards the outer surface is greater than the concentration towards the inner surface.

E2. A catalytic article according to embodiment 1 where at least 50 wt % of the noble metal component resides in the outer one fifth of the thickness of the catalytic layer.

E3. A catalytic article according to embodiments 1 or 2 where at least 60 wt % or at least 70 wt % of the noble metal component resides in the outer one half of the thickness of the catalytic layer.

E4. A catalytic article according to any of the preceding embodiments where the noble metal is palladium or platinum.

E5. A catalytic article according to any of the preceding embodiments where the support particles comprise a refractory metal oxide, for example a refractory metal oxide selected from the group consisting of alumina, zirconia, titania, ceria, manganese oxide, zirconia-alumina, ceria-zirconia, ceria-alumina, lanthana-alumina, baria-alumina, silica, silica-alumina and combinations thereof.

E6. A catalytic article according to any of the preceding embodiments where the support particles comprise an oxygen storage component, for example oxides of cerium, zirconium, neodymium, praseodymia, lanthanum, yttrium or combinations thereof.

E7. A catalytic article according to any of the preceding embodiments where the catalytic layer comprises from about 15 wt %, about 20 wt %, about 25 wt %, about 30 wt % or about 35 wt % to about 50 wt %, about 55 wt %, about 60 wt % about 65 wt % or about 70 wt % alumina based on the weight of the catalytic layer.

E8. A catalytic article according to any of the preceding embodiments where the catalytic layer comprises ceria, alumina and zirconia.

E9. A catalytic article according to any of the preceding embodiments where the noble metal is present in the catalytic layer from about 0.1 wt %, about 0.5 wt %, about 1.0 wt %, about 1.5 wt % or about 2.0 wt % to about 3 wt %, about 5 wt %, about 7 wt %, about 9 wt %, about 10 wt %, about 12 wt % or about 15 wt %, based on the weight of the layer.

E10. A catalytic article according to any of the preceding embodiments where the noble metal is present from about 2 g/ft³, about 5 g/ft³, about 10 g/ft³, about 15 g/ft³ or about 20 g/ft³ to about 40 g/ft³, about 50 g/ft³, about 60 g/ft³, about 70 g/ft³, about 80 g/ft³, about 90 g/ft³ or about 100 g/ft³, based on the volume of the substrate.

E11. A catalytic article according to any of the preceding embodiments where the catalytic layer contains support particles having a bimodal particle size distribution comprising micron-scaled particles and nano-scaled particles, for example containing particles having an average particle size from about 1, about 2, about 3, about 4 or about 5 microns to about 6, about 7, about 8, about 9, about 10 or about 11 microns and particles having an average particle size of 950 nm, 900 nm, 850 nm, 800 nm, 750 nm, 700 nm, 650 nm, 600 nm, 550 nm, 500 nm, 450 nm, 400 nm, 350 nm, 300 nm, 250 nm, 200 nm, 150 nm or 100 nm.

E12. A catalytic article according to any of the preceding embodiments where the substrate is a porous wall-flow filter or a flow-through monolith.

E13. A catalytic article according to any of the preceding embodiments where the substrate is ceramic or metallic.

E14. A catalytic article according to any of the preceding embodiments where 80 wt %, for example from about 80 wt % to about 90 wt % of the noble metal resides in the outer 20% of the thickness of the catalytic layer.

E15. An exhaust gas treatment system comprising a catalytic article according to any of the preceding embodiments in fluid communication with and downstream of an internal combustion engine.

E16. A method of treating an exhaust stream of an internal combustion engine comprising contacting the exhaust stream with the catalytic article according to any of the preceding embodiments.

Following are some more embodiments.

E1. A method of making a catalytic article comprising
providing a first mixture comprising micron-scaled support particles and applying the first mixture to a substrate to form a micro-particle layer;
providing a second mixture comprising nano-scaled support particles and a noble metal component having an initial pH and applying the second mixture to the micro-particle layer and
calcining the substrate.

E2. The method according to embodiment 1 where the micron-scaled particles have an average particle size from about 1, about 2, about 3, about 4 or about 5 microns to about 6, about 7, about 8, about 9, about 10 or about 11 microns and the nano-scaled particles have an average particle size of ≤950 nm, ≤900 nm, ≤850 nm, ≤800 nm, ≤750 nm, ≤700 nm, ≤650 nm, ≤600 nm, ≤550 nm, ≤500 nm, ≤450 nm, ≤400 nm, ≤350 nm, ≤300 nm, ≤250 nm, ≤200 nm, ≤150 nm or ≤100 nm.

E3. The method according to embodiments 1 or 2 where the second mixture is a sol or a colloidal dispersion.

E4. The method according to any of the preceding embodiments where the weight ratio of the solids of the second mixture to the solids of the first mixture is from about 1 to about 1, about 2, about 3, about 4, about 5, about 6, about 7 or about 8.

E5. The method according to any of the preceding embodiments where the second mixture is a sol having an initial pH≥2, ≥3, ≥4, ≥5, ≥6, ≥7, ≥8, ≥9 or ≥10.

E6. The method according to any of the preceding embodiments comprising adjusting the initial pH of the second mixture, for example adjusting the pH to ≤6, ≤5, ≤4 or ≤3.

E7. The method according to any of the preceding embodiments where the second mixture further comprises an organic dicarboxylic acid, for example a dicarboxylic acid selected from the group consisting of pimelic acid, fumaric acid, malic acid, adipic acid, sebacic acid, maleic acid, glutaric acid, azelaic acid, oxalic acid, tartaric acid, saccharic acid, aspartic acid, glutamic acid, tartronic acid, mesoxalic acid, oxaloacetic acid, adertone dicaroxylic acid and itaconic acid.

E8. The method according to embodiment 7 where the weight ratio of organic dicarboxylic acid to the noble metal component is from about 6, about 5, about 4, about 3 or about 2 to about 1.

E9. The method according to any of the preceding embodiments where the first mixture further comprises micron-scaled oxygen storage component particles.

E10. The method according to any of the preceding embodiments where the second mixture further comprises nano-scaled oxygen storage component particles.

E11. The method according to any of the preceding embodiments where the support particles of the first and second mixtures have identical chemical compositions.

E12. The method according to any of the preceding embodiments where the support particles of the first and second mixtures have different chemical compositions.

E13. The method according to any of the preceding embodiments where the support particles comprise a refractory metal oxide, for example a refractory metal oxide selected from the group consisting of alumina, zirconia, titania, ceria, manganese oxide, zirconia-alumina, ceria-zirconia, ceria-alumina, lanthana-alumina, baria-alumina, silica, silica-alumina and combinations thereof.

E14. The method according to any of the preceding embodiments where the second mixture is a sol.

E15. The method according to any of the preceding embodiments where the second mixture comprises a zirconium sol and an aluminum sol.

E16. The method according to any of the preceding embodiments where the second mixture comprises a zirconium sol, an aluminum sol and a cerium sol.

E17. A catalytic article prepared according to any of the above embodiments.

Example 1

A first mixture of $CeO_2$ and $Al_2O_3$ is combined with a nonionic surfactant and a protonated acid and distilled water and sufficiently mixed to create a homogenous dispersion. Mixing occurs over 20 minutes where the material undergoes particle size reduction to D90 14 microns, +/−3 microns. Soluble cerium salt is then added with an amorphous alumina binder and the pH is adjusted to 3.5 to 5. This mixture/dispersion is applied to a support, dried and calcined at 500° C. for approximately one hour.

A second mixture of cerium and zirconium sols, colloidal alumina and palladium salt is prepared and precipitated with a carboxylic acid. Following fixing of the Pd metal onto the sols, additional distilled water, barium hydroxide, lanthanum nitrate solution and binders are added and mixed for an additional 20 minutes.

The second mixture is applied over the first coating, dried and calcined at 500° C. for approximately one hour. The top coat is applied at a loading of 0.25 g/in$^3$ and the bottom coat is applied at a loading of 1.0 g/in$^3$. The total coating contains 0.70 g/in$^3$ $CeO_2$, 0.46 g/in$^3$ $Al_2O_3$, 0.017 g/in$^3$ Pd, 0.012 g/in$^3$ $La_2O_3$, 0.0044 g/in$^3$ $Ba(OH)_2$ and 0.044 g/in$^3$ $ZrO_2$.

FIG. 1 is a SEM image of the inventive coating. The arrow is pointed to the monolith wall. Pd is in adherence to $CeO_2$, $La_2O_3$, $ZrO_2$ and $Al_2O_3$ particles. Zr and Ce particles are typically the bright or white, while Al is a dull grey color.

The inventive coated monolith exhibits a high concentration of Pd towards the coating surface exposed to the atmosphere.

Figure 2:
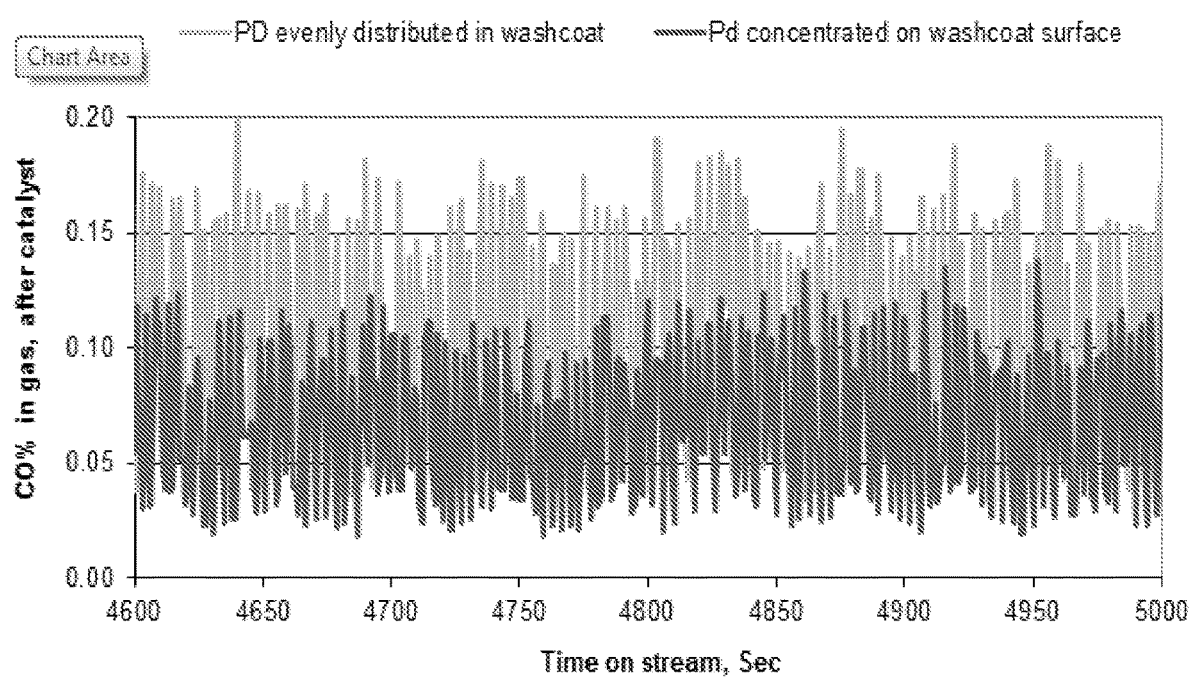
FIG. 2 is a graph of test results of CO conversion of a gas stream of Example 1.

The coated monolith is tested vs. a standard coating having well dispersed Pd throughout the coating. The standard coating contains an equal amount of Pd on conventional $CeO_2/Al_2O_3$ support. Samples are aged at 750° C., 24 hours, 10% steam/air prior to testing. Testing is performed at 450° C., space velocity 110,000 $h^{-1}$ with CO injection at 1 Hz and lambda swing at 0.98 to 1.08; NO=500 ppm, HC ($C_3H_6/C_3H_8$)=1800 ppmC, $CO_2$=10%, $H_2O$=7%, $CO/O_2$ varies base on lambda. The amount CO exiting the coated monoliths is determined by FTIR infrared spectroscopy. Results are in FIG. 2. It is seen the inventive coated monolith provides outstanding results vs. a comparative coating.

The invention claimed is:

1. A catalytic article comprising:
   a substrate having a catalytic coating thereon, the catalytic coating comprising:
       a catalytic layer having a thickness, an inner surface proximate to the substrate, and an outer surface distal to the substrate,
       wherein the catalytic layer comprises a noble metal component on support particles, and wherein the concentration of the noble metal component towards the outer surface is greater than the concentration towards the inner surface,
       wherein the catalytic layer comprises support particles having a bimodal particle size distribution comprising micron-scaled particles and nano-scaled particles.

2. A catalytic article according to claim 1, wherein at least 50 wt % of the noble metal component resides in the outer one fifth of the thickness of the catalytic layer.

3. A catalytic article according to claim 1, wherein at least 70 wt % of the noble metal component resides in the outer one half of the thickness of the catalytic layer.

4. A catalytic article according to claim 1, wherein ≥80 wt % of the noble metal resides in the outer 20% of the thickness of the catalytic layer.

5. A catalytic article according to claim 1, wherein the noble metal is palladium or platinum.

6. A catalytic article according to claim 1, wherein the support particles comprise a refractory metal oxide selected from the group consisting of alumina, zirconia, titania, ceria, manganese oxide, zirconia-alumina, ceria-zirconia, ceria-alumina, lanthana-alumina, baria-alumina, silica, silica-alumina and combinations thereof.

7. A catalytic article according to claim 1, wherein the support particles comprise oxides of cerium, zirconium, neodymium, praseodymia, lanthanum, yttrium or combinations thereof.

8. A catalytic article according to claim 1, wherein the catalytic layer comprises ceria, alumina and zirconia.

9. A catalytic article according to claim 1, wherein the noble metal is present from about 5 g/ft³ to about 100 g/ft³, based on the volume of the substrate.

10. An exhaust gas treatment system comprising a catalytic article according to claim 1 in fluid communication with and downstream of an internal combustion engine.

11. The catalytic article according to claim 1, wherein the micron-scaled particles have an average particle size from about 1 micron to about 50 microns, and wherein the nano-scaled particles have an average particle size of from about 1 nm to about 900 nm.

12. The catalytic article according to claim 11, wherein the nano-scaled particles have an average particle size of from about 50 nm to about 900 nm.

13. The catalytic article according to claim 11, wherein the micron-scaled particles have an average particle size from about 5 microns to about 30 microns.

14. The catalytic article according to claim 11, wherein the micron-scaled particles have an average particle size from about 10 microns to about 20 microns.

15. The catalytic article according to claim 11, wherein the micron-scaled particles have an average particle size of about 14 microns.

* * * * *